United States Patent [19]

LeMire et al.

[11] Patent Number: 5,478,467

[45] Date of Patent: Dec. 26, 1995

[54] WATER PURIFICATION DEVICE

[76] Inventors: George J. LeMire, 57 South St., Plainville, Mass. 02762; Nathan A. Rihani, 52 Foxglove Dr., Cranston, R.I. 02920

[21] Appl. No.: 282,343

[22] Filed: Jul. 29, 1994

[51] Int. Cl.⁶ ........................................................ C02F 1/50
[52] U.S. Cl. ........................ 210/206; 210/266; 210/282; 210/287; 210/449; 210/501
[58] Field of Search ................................ 210/209, 282, 210/287, 446, 449, 205, 501, 764, 206, 266, 198.1

[56] References Cited

U.S. PATENT DOCUMENTS

| | | | |
|---|---|---|---|
| 423,767 | 3/1890 | Hough | 210/282 |
| 470,192 | 3/1892 | Gross | 210/449 |
| 494,837 | 4/1893 | Bellamy | 210/266 |
| 712,868 | 11/1902 | Traxton | 210/287 |
| 1,000,332 | 8/1911 | Dyer | 210/314 |
| 1,034,194 | 7/1912 | Buckley | 210/282 |
| 1,204,171 | 11/1916 | McKay | 210/501 |
| 1,333,011 | 3/1920 | Crady | 210/282 |
| 4,024,991 | 5/1977 | Tyson et al. | 210/501 |
| 4,504,387 | 3/1985 | LeMire et al. | 210/206 |
| 4,608,247 | 8/1986 | Heinig, Jr. | 210/501 |
| 4,888,118 | 12/1989 | Barnes et al. | 210/668 |
| 4,935,116 | 6/1990 | LeMire | 204/237 |
| 4,997,563 | 3/1991 | Jones | 210/282 |
| 5,192,436 | 3/1993 | Sasaki et al. | 210/282 |

*Primary Examiner*—Cynthia L. Nessler
*Attorney, Agent, or Firm*—Robert J. Doherty

[57] ABSTRACT

A water purification device for attachment to a hose or other water supply such that water flowing through the device comes in intimate contact with a treatment media including free available silver ions to provide a anti-bacteria and germicide treatment of the water flowing therethrough. Preferably, the device includes an inner chamber having opposed pairs of shells, and treatment media is disposed in at least one of such shells.

5 Claims, 3 Drawing Sheets

5,478,467

WATER PURIFICATION DEVICE

BACKGROUND AND OBJECTS OF THE INVENTION

This invention relates to a water purification system and more particularly to a device in which silver ions are used to kill and/or prevent the growth of germs and bacteria in pools or the like and more particularly to small pools such as wading pools or tubs that are generally filled on a per use basis. It is generally known to utilize such silver ions to clean and purify swimming pools and the like, reference being particularly made to the following U.S. patents: U.S. Pat. No. 4,504,387 issued Mar. 12, 1985 and entitled SYSTEM AND METHOD FOR WATER PURIFICATION to George J. LeMire et al; U.S. Pat. No. 4,608,247 issued Aug. 26, 1986 to Charles F. Heinig, Jr. and entitled COMPOSITION FOR BACTERICIDAL TREATMENT OF WATER; and U.S. Pat. No. 4,935,116 issued Jun. 19, 1990 to George J. LeMire and entitled WATER PURIFICATION DEVICE.

The continued popularity of small backyard-type pools and the introduction of soaking or hot tubs has increased the need for the provision of a germ free water supply. Presently, it is customary to treat swimming pools with chlorine to kill the bacteria and germs present therein. There are, however, decided drawbacks to such systems some of which are discussed in the above-mentioned patents. Accordingly, it has been found desirable to eliminate chlorine disinfection systems and to utilize heavy metals and particularly heavy metals of the type commonly referred to as oligodynamic metals for the bactericidal treatment of water. A discussion of the use of such metals is also found in the above-discussed patents. The above-mentioned patent specifications are herewith specifically included in the subject specification by specific reference and incorporation thereinto.

Specifically, it would thus be desirable to provide a simple and yet effective device to initially provide such backyard pools and tubs with water which is already treated and thus germ and bacteria free prior to filling such devices rather than afterwards. In other words instead of relying on more complex, expensive in-line equipment which treats recycled pool or tub water, the make up water is initially treated. Accordingly, these and other objects of the present invention are accomplished with a device adapted for in-line connection to the terminal end of a water supply line which in turn contains a composition adapted to supply free silver ions to the water flow as it enters the pool or tub device and which device supplies the appropriate desired contact between the composition medium and the water being treated.

A further object of the present invention is the provision of a device which is simple in construction yet portable, low cost and which can be easily used and discarded by the homeowner and which requires no special equipment for such use.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
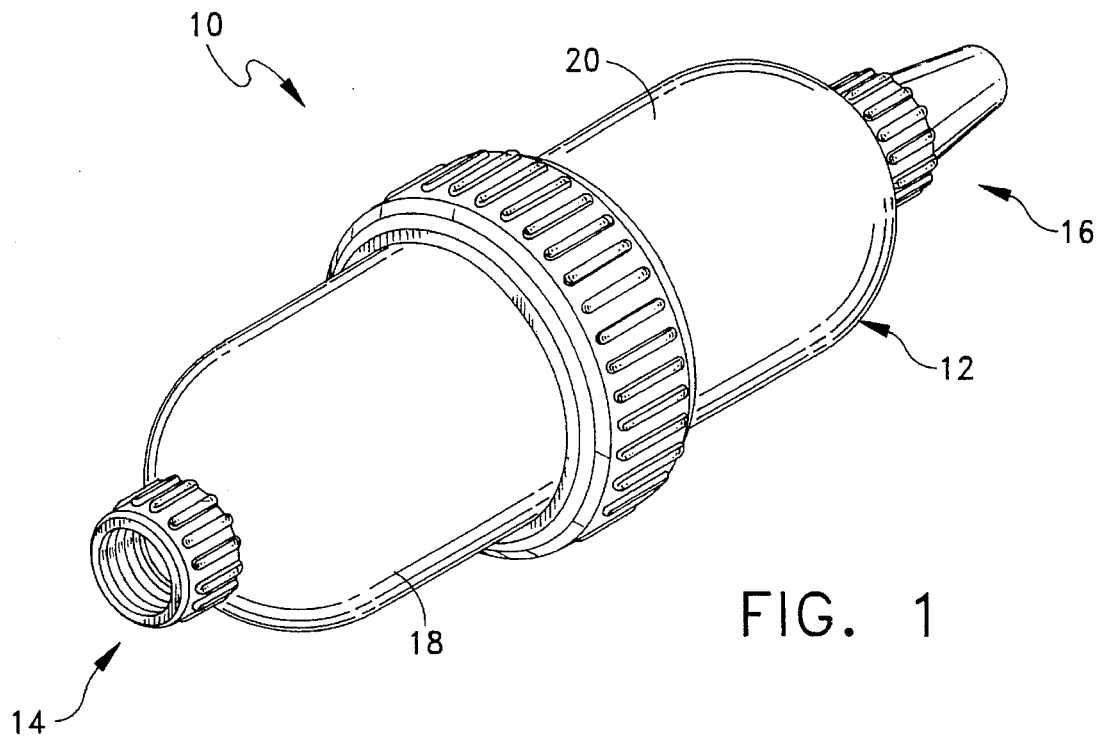
FIG. 1 is a rear perspective view of the device of the present invention.

Turning now to the drawings and particularly FIG. 1 thereof, the overall configuration and exterior appearance of the device 10 of the present invention as shown. Such device 10 includes an outer housing 12 having an upstream inlet end 14 and a downstream exit end 16. The housing 12 includes a first or upstream segment 18 and second or downstream segment 20. Both such segments 18, 20 are preferably of somewhat elongated, open-ended configuration, that is, with a somewhat conical forward configuration 22, 24 respectively and open at a rear or base peripheral circular lip 26, 28 respectively. The lip 26 is further provided with a circular seat 30 for receipt of the lip 28 and further the body 22 is provided with a connection means in the form of a circular flange 32 provided with threads 34 such that a connector piece 36 inwardly provided with threads 37 can be utilized to join the two housing segments 18 and 20 together and yet easily provide for their separation for repeated use. In that regard, the area of the second housing segment 20 is provided with a raised lip 38 for abutment with the terminal connector portion or element 40 of the flange 32 and with a downwardly extending ledge 42 provided on the rear portion of the connector element 40 such that appropriate stop means is provided with a tight connection between the segments 18 and 20 and the connection means 32 is achieved.

It will thus be apparent that the housing segments 18 and 20 cooperatively form an interior chamber 50 closed except for an inlet 52 including an opening at its upstream end 14 and an exit means 54 including an opening at its downstream end 16. The inlet 52 is preferably formed integrally with the rear portion of the segment 18 and comprises a laterally extending circular boss 56 which is provided with threads 58 on the inner surface thereof such that it can easily receive the end of a water supply such as the threaded nozzle of a garden hose and the like. Immediately adjacent the passageway 60 provided by such boss 56 is a circular opening 62 providing communication with the interior of the chamber 50 as will be hereinafter more fully explained. Water entering the opening 62 is thus free to pass through the chamber for contact with treatment media M and thence outwardly into the tub or pool once so treated via the exit means 54. Such exit means 54 includes an elongated spout 64 hollow in construction and preferably provided with a terminal end formed of a downwardly tapered spout 66. The outer surface of the spout 64 is preferably provided with a knurled surface 68 as is the outer surface of the boss 56 positioned at the other end of the housing 12 for manipulation ease.

In order to provide a suitable means by which the water entering and exiting the treatment chamber can be brought into controlled contact with the treatment medium, a pair of shells preferably of equal size and shape are provided for such purpose. Each such shell 70 has a somewhat upright elongated conical side wall 72 which terminates at the upper end in a reduced diameter opening 74 such that such opening 74 can be placed adjacent to the entrance opening 62 at one end of the chamber and the exit opening 65 at the opposite chamber end. The base or lower portion 76 of the wall 72 terminates in an opening 78 at which point the wall 72 is preferably provided with a small outwardly extending ledge 80 and a downwardly extending flange 82 so as to form a pocket or recess 84 for receipt of a baffle or flow control device 86 which baffle 86 is in the form of a disc 88 having a plurality of patterned openings 90 including a circular central opening 92. The baffle is, accordingly, adapted to be placed into the recess, 84 such that the flow through the treatment chamber can be regulated or controlled especially to create desirable turbulence in the water flow.

Figure 3:
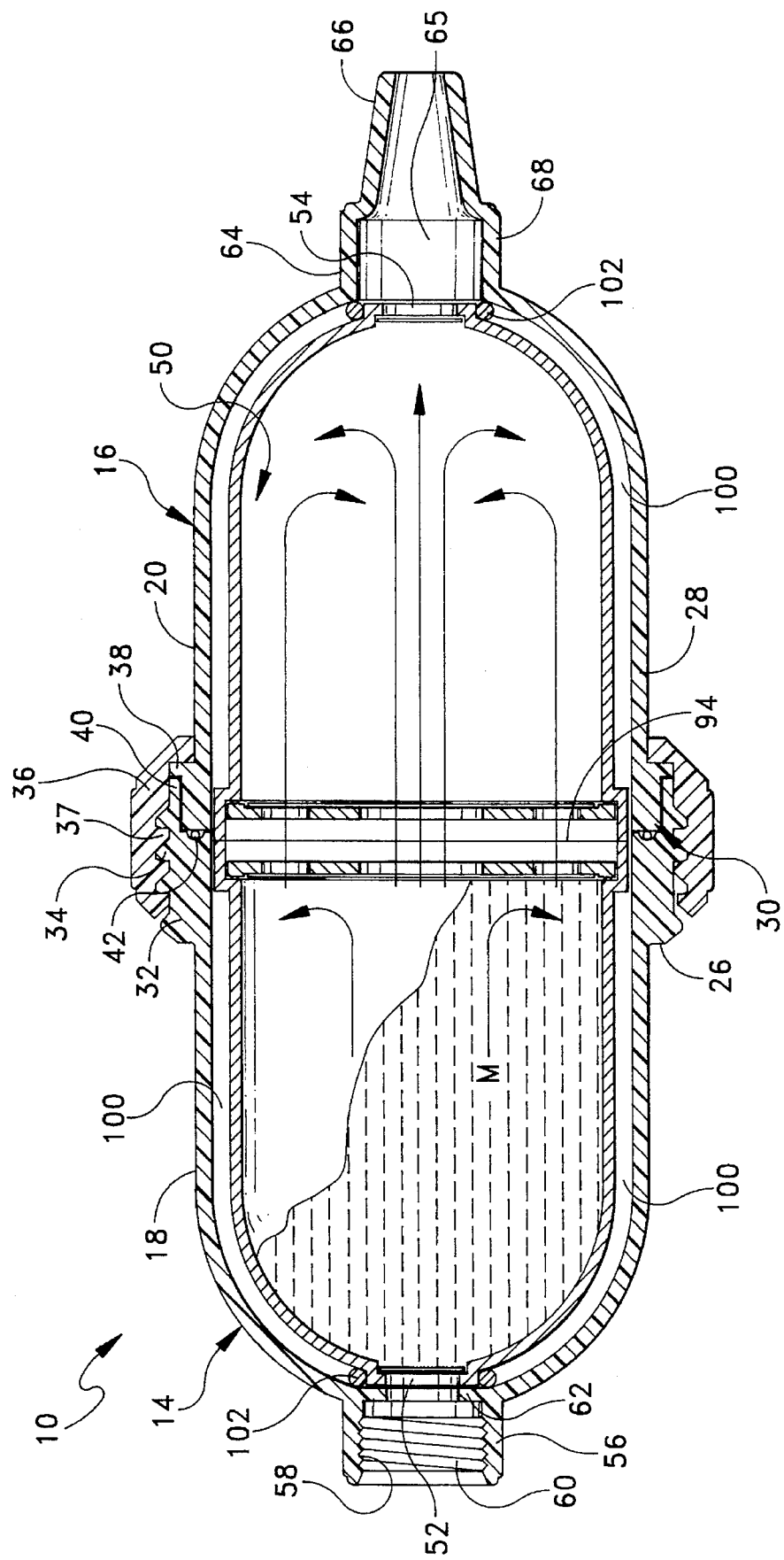
FIG. 3 is a side sectional view taken along the line 3—3 of FIG. 2.
Figure 4:
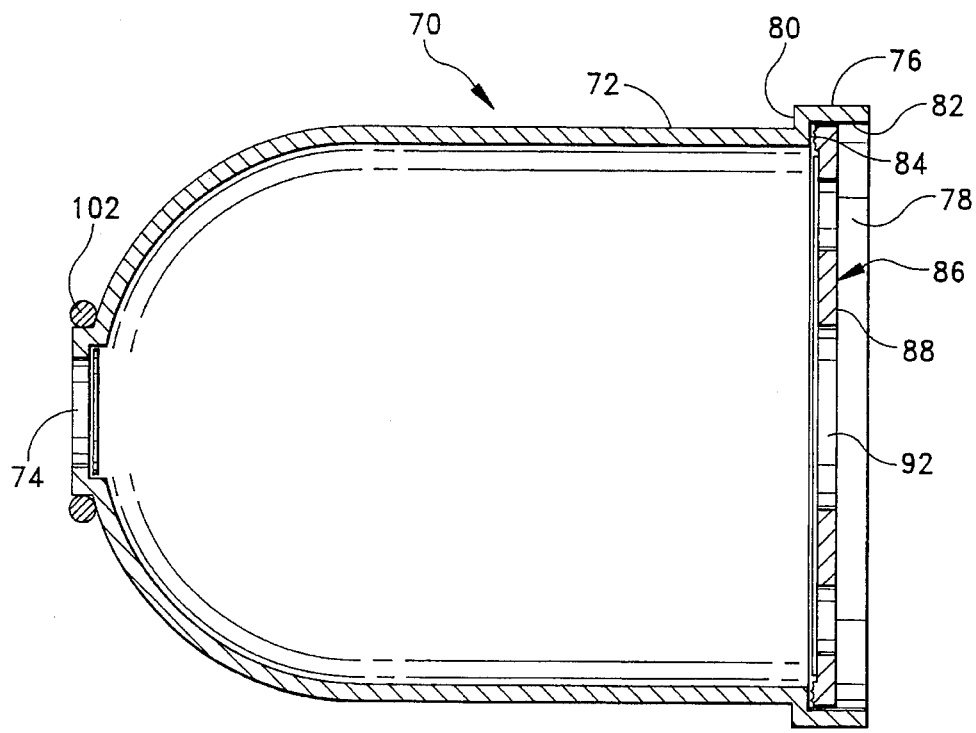
FIG. 4 is a transverse sectional view of a portion of FIG. 3.
Figure 5:
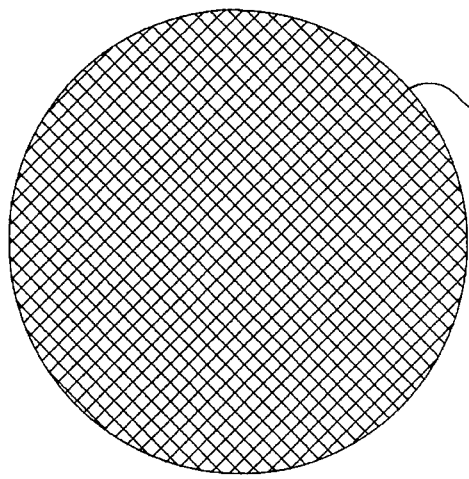
FIG. 5 is an elevational view of a bottom plate configuration.
Figure 6:
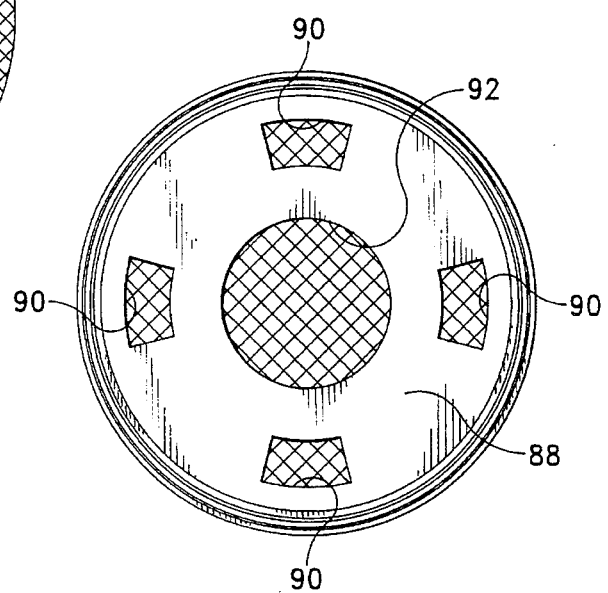
FIG. 6 is a similar view of a screen therefore.

When a pair of such shells are placed base to base as depicted in the FIG. 3 drawing, the pattern of openings 90 can either be aligned with each other, slightly misaligned or completely misaligned to enhance or reduce such turbulence. Additionally, the baffles 86 are laterally spaced from each other such that a central chamber 94 is created therebetween. Such central chamber 94 contributes aeration and air bubbling trapped by the water being treated as it passes through the chamber 50. In addition, the diameter of the shells 70 is slightly less than the interior diameter of the treatment chamber 50 such that a circumferential space 100 is formed between the aligned shell pair and the inside surface of the treatment chamber such that such space 100 may provide a air source to further aid in air bubbling and to insure proper tolerance fit between the shells and the chamber. In that regard, it should also be pointed out that an O ring seal is preferably provided at the upper end of each shell 70 and adapted to circumferentially engage adjacent treatment chamber surfaces near the entrance and exit ends 14, 16 respectively. In this way, treatment water moving into the device need not enter the initial air space 100 either upon its entrance or upon its exit from the treatment chamber 50. Contributing to the shell spacing with respect to the interior treatment chamber surface, is the previously mentioned shoulders 80 and flange 82 of the shell walls 72. In this regard, the outer flange surface is adapted to contact the inner surface of the treatment chamber so as to not only space the shells in the desired relationship with the treatment chamber but also to positively position them with respect to each other. Preferably a slight inward longitudinal pressure is brought to bear upon the shells and thus the seals 102 when the connection means 40 is tightened to the desired level.

Figure 2:
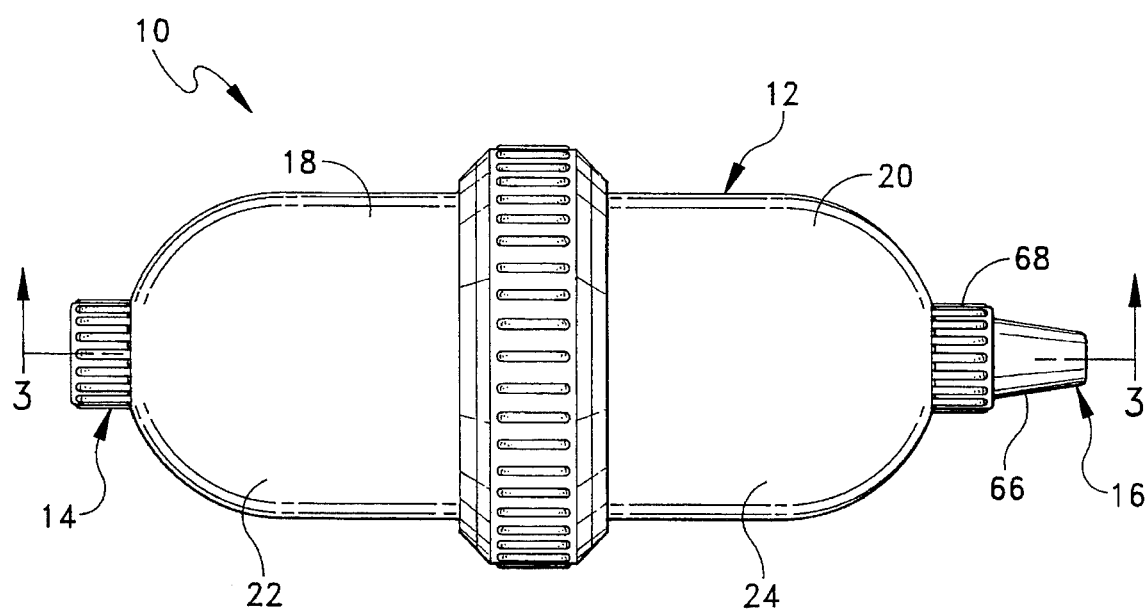
FIG. 2 is a side view thereof.

Preferably in operation of the device, the shell 70 located in the upstream or first segment 18 of the housing is at least partially filed with the aforementioned treatment medium M, for instance, that disclosed in the aforementioned U.S. Pat. Nos. 4,504,387 and 4,608,247 which as previously has been brought out the disclosures of which are hereby incorporated into the present specification by specific reference thereto. Such media M is loosely filled in the shell so that it can move around and present different surfaces for contact with the water as it moves therethrough. Thus some of the water moves centrally through the medium and other water portions move more laterally towards the confining inside shell surfaces as depicted by the various arrows shown in FIG. 2.

Accordingly, some of the water passes directly through the first shell through the central openings 90 and enters the second shell whereas some of the water flow is re-diverted by reason of contact with the baffles; but in any event, intimate contact of a turbulent nature is brought about between the treatment medium and the water being treated. In this regard and as previously pointed out, it should be indicated again that the shells may be rotationally moved with respect to each other such that the baffles are completely aligned or completely misaligned or somewhat between with respect to each other so that the flow turbulence through the treatment chamber 50 can be enhanced, reduced or otherwise controlled. Also, both the upper and lower shell ends are preferably provided with a smaller screen disc 104 at the upper end and a larger disc at the bottom end to assure small media particles are retained therein. Generally, it has been found most effective to only charge the upstream shell 70 with treatment media M and then about two thirds full such that the ion contact and pickup takes place by the water initially in the upstream half of the chamber 50 and then is swirled about and subject to turbulence in the next half and in the intermediate central chamber 94.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A water purification device for in line connection to the terminal end of a water supply line having a water flow therein comprising an outer housing formed by a first upstream hollow housing segment and a second downstream hollow housing segment, said housing segments each having an open base portion with said base portions disposed in abutting relation with each other and connection means for releasably retaining said base portions together, said housing further having opposed ends including an upstream end in turn having inlet means for receiving said water flow, an interior chamber formed by connection of said housing segments for treating said water flow and an outlet end for directing the treated water flow where desired, said interior chamber being further divided into subchambers including a first upstream subchamber and a second downstream subchamber by means of replaceable shell means disposed in said chamber, said replaceable shell means having opposed upstream and downstream ends in turn disposed in water sealing relationship with said interior chamber such that water progressively passes through said upstream and downstream subchambers and then exits said device and at least said upstream subchamber being partially filled with a treatment medium in turn having available silver ions therein for contact with and treatment of said water flow, said replaceable shell means comprising a pair of hollow shells each having opposed open ends including a large diameter base and a small diameter top, said shells disposed in base to base longitudinal position in said chamber, said shells forming said subchambers with the upstream disposed shell containing said treatment medium, said shell means having a circular compressible sealing means at each of said opposed upstream and downstream ends thereof wherein each said sealing means contacts interior portions of said respective hollow housing segments.

2. The device of claim 1, wherein said shell means is further interiorly spaced from the interior wall of said chamber by means of a circumferential air space.

3. The device of claim 1, wherein said shell bases are centrally longitudinally spaced from each other so as to form an intermediate centrally disposed air/water mixing compartment between said shells.

4. The device of claim 3, wherein at least said upstream shell includes screens disposed at both the ends thereof to retain said treatment media therein but simultaneously permit water flow therethrough.

5. The device of claim 3, wherein said device further includes means for regulating the flow of water through said shells, said regulating means including said shell bases each having a closure wall in turn having a pattern of openings disposed therein, and said shells partially rotatable with respect to each other such that said openings can be aligned, misaligned or partially aligned.

* * * * *